United States Patent [19]

Papalexis et al.

[11] Patent Number: 4,503,966

[45] Date of Patent: Mar. 12, 1985

[54] HOTDOG ROLL ALIGNER

[76] Inventors: Gregory C. Papalexis, Cambridge Way, Alpine, N.J. 07620; Richard I. Elliott, 103 Pennfield Ave., Croton On Hudson, N.J. 10502

[21] Appl. No.: 500,844

[22] Filed: Jun. 3, 1983

[51] Int. Cl.³ .............................................. B65G 47/24
[52] U.S. Cl. .................................. 198/382; 198/394; 198/399
[58] Field of Search ............... 198/382, 396, 431, 394, 198/399

[56] References Cited

U.S. PATENT DOCUMENTS

| | | | |
|---|---|---|---|
| 3,024,889 | 3/1962 | Reading | 198/399 |
| 3,068,989 | 12/1962 | Packman et al. | 198/382 |
| 3,180,476 | 4/1965 | Marasso et al. | 198/382 |
| 3,386,557 | 6/1968 | Ross et al. | 198/400 |
| 3,478,861 | 11/1969 | Elmendorf | 198/382 |
| 3,556,280 | 1/1971 | Schnee | 198/431 |

FOREIGN PATENT DOCUMENTS 664892 5/1979 U.S.S.R. ............................ 198/399

*Primary Examiner*—Joseph E. Valenza
*Assistant Examiner*—Douglas C. Voorhees
*Attorney, Agent, or Firm*—Peter C. Michalos; Constantine A. Michalos

[57] ABSTRACT

A device for aligning flat bottomed rolls, in particular hotdog rolls, comprises a plurality of elongated parallel stalls for receiving flat bottomed rolls, a first conveyor movable over at least a portion of the stalls for distributing rolls into the stalls in a random manner, a second conveyor movable in a feed direction parallel to the stalls, under the stalls, for conveying rolls along the stalls, a third conveyor movable transversely to the feed direction over the second conveyor and under the stalls for flipping the rolls. The third conveyor has a friction surface which engages the rolls and causes them to roll until a flat bottom of the rolls engage the third conveyor. The friction surface is insufficient to thereafter rotate the rolls further. Drive motors are connected to the first, second and third conveyor. Each of the rolls in the stalls are thus rotated in a properly aligned upright position in which they can be transfered to a packing device.

9 Claims, 4 Drawing Figures

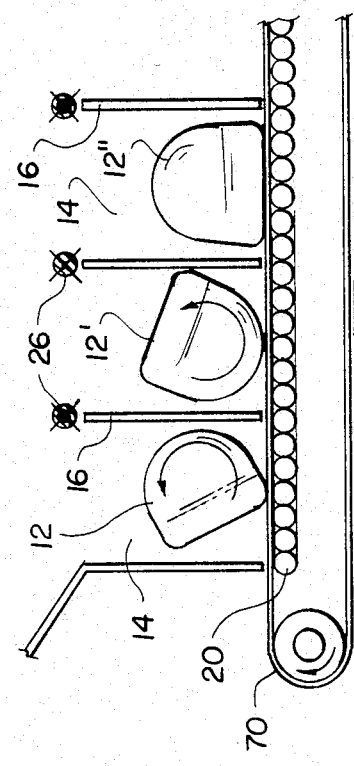
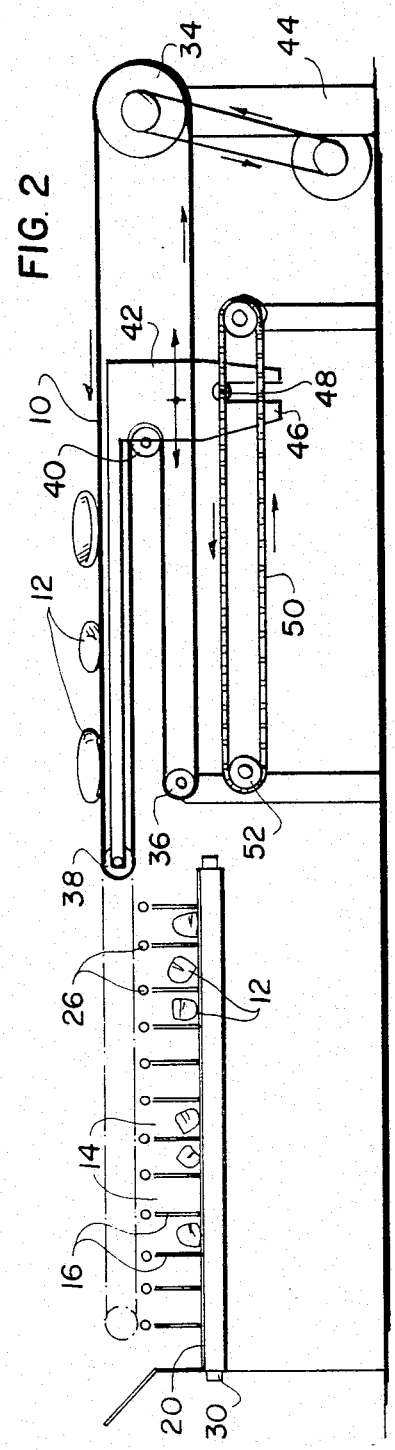
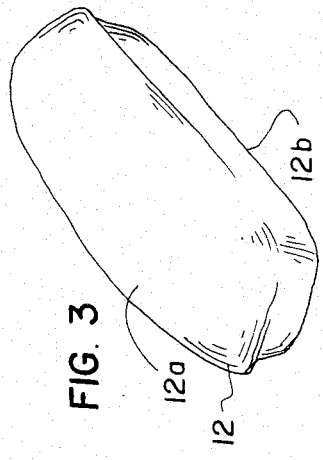

HOTDOG ROLL ALIGNER

FIELD AND BACKGROUND OF THE INVENTION

The present invention relates in general to food handling material and in particular to a new and useful device for aligning elongated flat bottomed rolls, in particular hotdog rolls, so that they can be supplied to a packing machine in an ordered upright fashion.

Devices are known for automatically baking, cooling and packing frankfurter or other flat bottomed rolls. No device is as of yet availlable however for automatically transferring the rolls from cooling conveyor to the packing apparatus in an orderly upright fashion.

SUMMARY OF THE INVENTION

The present invention is drawn to a device which takes a random distribution of elongated flat bottom rolls, and particular hotdog rolls, and aligns the rolls in parallel upright rows for a packing machine.

Accordingly an object of the present invention is to provide a flat bottomed roll aligner which comprised a plurality of elongated parallel stalls for receiving flat bottomed rolls, a first conveyor movable over at least a portion of the stalls for distributing rolls into the stalls in a random manner, the rolls being aligned for movement in a parallel feed direction by falling into the stalls, a second conveyor movable in a feed direction parallel to the rolls and under the stalls for moving the rolls in the feed direction and a third conveyor movable at an angle to the feed direction, and in particular transversely to the feed direction, over the second conveyor and under the stalls for flipping the rolls. The third conveyor has a friction surface which engages the rounded portions of the rolls for rotating them around their major axis. When the flat bottom of each roll engages the friction surface however the friction surface is insufficient to further rotate the rolls. Drive means are connected to each of the first, second and third conveyor for effecting the desired movement thereof. When the rolls leave the stalls they are aligned in rows with each roll being upright.

A further object of the invention is to provide a roll aligner for aligning flat bottomed elongated rolls which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be made to the accompanying drawings and descriptive matter in which there is illustrated a preferred embodiment of the invention.

BRIEF DESCRIPTION OF THE DRAWINGS

In the drawings:

FIG. 2 is a side elevational view of the device shown in FIG. 1;

FIG. 3 is top perspective view of a hotdog roll which is representitive of the elongated flat bottom rolls which can be aligned by the invention; and FIG. 4 is a sectional view taken through some of the stalls showing how a flat bottom roll is rotated into an upright position in accordance with the invention.

DESCRIPTION OF THE PREFERRED EMBODIMENT

Figure 1:
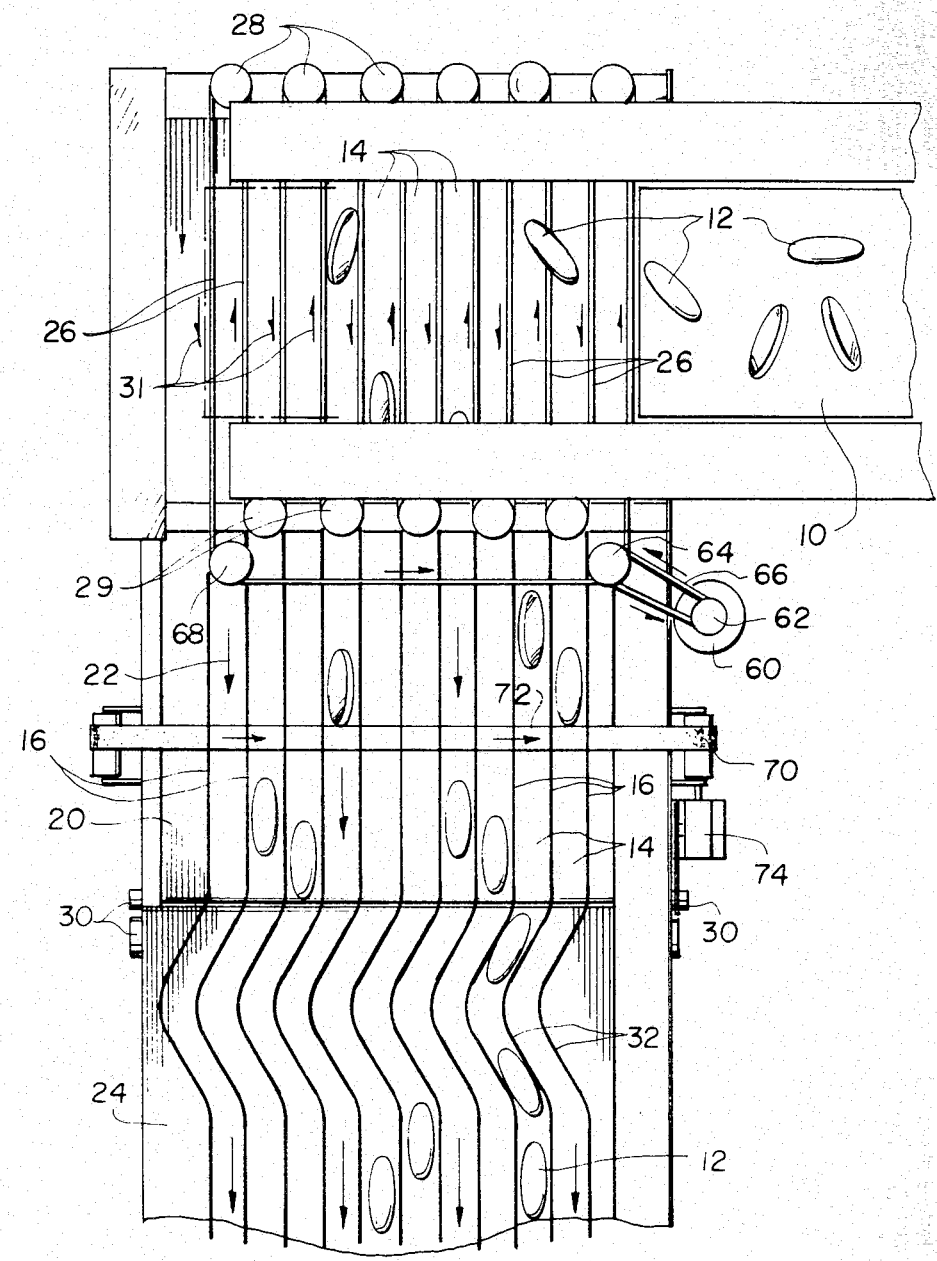
FIG. 1 is a top plan view of the roll aligning device in accordance with the invention.

Referring to the drawings in particular, the invention embodied therein, in FIG. 1, comprises a flat bottomed roll aligner comprising a first conveyor 10 for conveying a pluraility of flat bottomed rolls 12, in a random manner over a plurality of elongated aligned stalls 14. Stalls 14 are in the form of elongated passages slightly larger than the width of the elongated rolls 12, defined between upright walls 16. A second or feed conveyor 20 moves in a feed direction shown by arrows 22, under the stalls 14. A further conveyor 24 moves down stream of the outlet ends of stalls 14 to move now aligned and upright rolls 12 to a packing device (not shown).

To avoid damage to rolls 12, conveyors 20 and 24 are made of a plurality of long flexible springs wound on rollers, such as rollers 30, extending across the device in the feed direction. The structure of such conveyors are known so that additional details are not provided here.

At the outlet end of stalls 14, that is the lower end of walls 16 as shown in FIG. 1, a plurality of curved wall portions 32 are provided which introduce a dwell time for movement of the rolls before they reach the packing device.

Referring to FIG. 2, first conveyor 10 comprises a conveyor belt wrapped around a fixed drive roller 34 and a fixed idler roller 36. The conveyor belt is also wrapped around two movable rollers 38 and 40 which are both mounted to a movable frame 42. Movable frame 42 is mounted for linear back and forth movement on a fixed frame 44. Movable frame 42 includes a cam follower 46 which movably receives a cam 48. Cam 48 is in the form of a roller fixed to one link of a chain 50 that rides between sprockets 52 on fixed frame 44. The movement of chain 50 causes movable frame 42 to first move to the left and then to the right at the same linear speed as the conveyor belt of conveyor 10 which is moved by drive roller 34. In this way, the rolls 12 which are distributed in random fashion on the top of conveyor 10 (see FIG. 1) are first conveyed over the stalls 14 and then, as movable frame 42 moves to the right as shown in FIG. 2, the rolls are dropped into the stalls 14.

In order to insure that each roll 12 drops into a respective stall 14, an aligning belt having multiple loops moves over a portion of the walls 16 over which rolls 12 are dropped by conveyor 10. Belt 26, which is elastic and has a round cross-section, is trained around a plurality of first pullies 28, and second pullies 29. This permits the separate loops of belt 26 to move in a direction of arrows 31 so that rolls 12 will always be rotated into alignment with the feed direction 22 and fall into the stalls 14 between the walls 16.

Belt 26 is driven by a motor 60 which rotates a pully 62, a pully 64 over a belt 66 and idler pully 68.

It is noted that the spacing between walls 16 which form stalls 14, is less than the length of elongated rolls 12 so that the rolls are positively rotated by belt 26.

While the apparatus described thus far is effective to align the rolls 12 in stalls 14, the rolls may still be upside down or in some other non upright position which does not permit there assembly and packing. To cause rotation of the rolls into their upright position, a third conveyor 70 is provided which comprises a friction belt moving substantially transversely or at least at some angle to the feed direction 22, in the direction of arrow 72. The service of the belt in conveyor 70 is chosen to be sufficiently rough to permit rotation of the rolls but not so rough that the belt will cause further rotation of the rolls once they are bottom side down.

As shown in FIG. 4, with movement to the right of the upper run of the belt of conveyor 70, a roll 12 in the lefthand stall shown is about to be rotated into its upright position. A roll 12' in the middle stall 14 is upside down but in the course of rotating into its proper position. The roll 12" in the right-hand stall shown has already come to its upright position so that the belt of conveyor 70 moves under this roll without effect.

Conveyor 70 is driven by a gear transmission 74 that receives power from one of the rollers 30 which drive second conveyor 20. The belt of conveyor 70 is driven at sufficient speed so that the time each roll spends on conveyor 70 is sufficient to rotate the roll into its upright position.

The belt of conveyor 70 is also sufficiently thin and narrow so that the rolls 12 do not become caught on the conveyor but simply continue in the feed direction 20.

With the device as described above, when the rolls reach the curved wall portions 32, they are aligned in rows with each roll being upright.

The type of roll which can be aligned with this divice is elongated and has a flat bottom as shown in FIG. 3. Such rolls are commonly known as hotdog rolls. Other rolls having curved tops and flat bottoms or substantially flat bottoms, and an elongated shape may also be alighned in accordance with the invention. The roll need only have a somewhat curved upper portion 12a and a somewhat flat bottom portion or surface 12b.

While specific embodiment of the invention have been shown and described in detail to illustrate the application of the principles of the invention, it will be understood that the invention may be embodied otherwise without departing from such principles.

What is claimed is:

1. An aligning device for flat bottomed rolls, comprising:
    means defining a plurality of elongated parallel stalls for receiving flat bottomed rolls, said means extending in a feed direction;
    a first conveyor movable over at least a portion of said stalls for distributing rolls into said stalls in a random manner;
    a second conveyor movable in a feed direction parallel to said stalls, under said stalls for conveying the rolls along said stalls in the feed direction;
    a third conveyor movable at an angle to the feed direction over said second conveyor and under said stalls for flipping rolls in said stalls by frictionally engaging each roll as it passes over said third conveyor to rotate each roll until a bottom of each roll engages said third conveyor, a frictional surface of said third conveyor chosen so that the rolls are not further rotated by movement of said third conveyor under the bottom of each roll; and
    drive means connected to said first second and third conveyors for moving said first second and third conveyors.

2. An aligning device according to claim 1 including aligning means movable over and between said stalls for rotating rolls in a horizontal plane so that each roll falls into a stall, said first conveyor positioned to drop rolls onto said alignment means.

3. An aligning device according to claim 2 wherein said means defining said stalls comprise a plurality of parallel walls, said alignment means comprising a belt movable in alternate directions over said walls and along a top of said wall.

4. An aligning device according to claim 2 including reciprocating means connected to said first conveyor for moving a leading end of said first conveyor across tops of said stalls in a direction substantially transverse to the feed direction for distributing rolls into said stalls.

5. An aligning device according to claim 4 wherein said alignment means comprises a belt movable in alternated directions over and between said plurality of stalls.

6. A device according to claim 5 wherein said reciprocating means comprises a chain having a roller cam connected thereto, said first conveyor comprising a fixed frame, a drive roller connected at a fixed location to said fixed frame, an idler roller connected at first location to said fixed frame and spaced from said drive roller, a movable frame having a cam follower engaged with said roller cam and carrying at least one additional idler roller, and a conveyor belt entrained on said drive roller, said first mentioned, and said at least one additional idler rollers.

7. An aligning device according to claim 5 wherein said alignment means belt comprises a round elastic belt, said means defining said stalls comprising a plurality of upright parallel walls each having a loop of said alignment means belt moving at a top edge thereof.

8. An alignment device according to claim 7 including a first plurality of pullies positioned over alternate ones of said stalls at one end of said stalls, and a second plurality of pullies positioned over alternate ones of said stalls over which said first plurality of pullies are not positioned, said alignment means belt entrained around said first and second plurality of pullies.

9. An alignment device according to claim 8 wherein said first and second conveyors comprise a plurality of elongated spring rotating around spaced apart rollers.

* * * * *